United States Patent
Wang et al.

(10) Patent No.: US 9,504,053 B2
(45) Date of Patent: Nov. 22, 2016

(54) METHODS FOR SCHEDULING COMMUNICATION RESOURCES TO A WIRELESS DEVICE AND SCHEDULING DEVICE

(75) Inventors: Hongwei Wang, Solna (SE); Björn Nordström, Stockholm (SE); Ying Sun, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 39 days.

(21) Appl. No.: 14/407,566

(22) PCT Filed: Jun. 20, 2012

(86) PCT No.: PCT/SE2012/050687
§ 371 (c)(1),
(2), (4) Date: Dec. 12, 2014

(87) PCT Pub. No.: WO2013/191603
PCT Pub. Date: Dec. 27, 2013

(65) Prior Publication Data
US 2015/0139110 A1 May 21, 2015

(51) Int. Cl.
*H04W 4/00* (2009.01)
*H04W 72/10* (2009.01)
*H04W 72/04* (2009.01)
*H04W 72/12* (2009.01)

(52) U.S. Cl.
CPC ............. *H04W 72/10* (2013.01); *H04W 72/04* (2013.01); *H04W 72/1247* (2013.01); *H04W 72/0473* (2013.01)

(58) Field of Classification Search
CPC ................ H04W 72/00; H04W 72/005–72/14

USPC .................................................. 370/329–331
See application file for complete search history.

(56) References Cited

U.S. PATENT DOCUMENTS

| | | | | | |
|---|---|---|---|---|---|
| 5,191,578 A | * | 3/1993 | Lee | ........................ | H04L 49/101 370/369 |
| 6,975,613 B1 | * | 12/2005 | Johansson | ............. | H04W 72/12 370/331 |
| 2004/0117790 A1 | * | 6/2004 | Rhine | ................... | G06F 9/5038 718/100 |

(Continued)

FOREIGN PATENT DOCUMENTS

| EP | 2 056 616 | | 5/2009 |
|---|---|---|---|
| EP | 2056616 | * | 5/2009 |
| EP | 2 106 187 | | 9/2009 |

OTHER PUBLICATIONS

PCT Written Opinion of the International Searching Authority for International application No. PCT/SE2012/050687, Nov. 30, 2012.

(Continued)

*Primary Examiner* — Afsar M Qureshi
(74) *Attorney, Agent, or Firm* — Baker Botts, LLP

(57) ABSTRACT

The disclosure relates to a method 10 performed in a scheduling device 3 for scheduling communication resources to a wireless device 4 configured for wireless communication within a communication system 1. The method 10 comprises detecting 11, within a group of wireless devices of a first priority class, a first wireless device 4 to be scheduled; determining 12 a cluster time for the first wireless device 4; and scheduling 13, for the duration of the determined cluster time, consecutive communication resource units to the first wireless device 4.

12 Claims, 3 Drawing Sheets

(56) References Cited

U.S. PATENT DOCUMENTS

| | | | |
|---|---|---|---|
| 2008/0232284 A1* | 9/2008 | Dalsgaard | H04W 72/042 370/310 |
| 2008/0291830 A1* | 11/2008 | Pernu | H04W 72/02 370/236 |
| 2009/0285196 A1* | 11/2009 | Lee | H04L 47/14 370/345 |
| 2014/0226574 A1* | 8/2014 | Guo | H04L 5/0037 370/329 |
| 2015/0023261 A1* | 1/2015 | Lunttila | H04L 1/0027 370/329 |

OTHER PUBLICATIONS

PCT International Search Report for International application No. PCT/SE2012/050687, Nov. 30, 2012.

3GPP TSG-RAN2 Meeting #61; Sorrento, Italy; Title: Issues on VoIP Support (Tdoc R2-080829), Feb. 11-15, 2008.

3GPP TSG RAN WG1 #50bis Meeting; Shanghai, China; Title: Multi-TTI Uplink Grants for TDD (FSI-FS2) (R1-074324; R1-073646) Oct. 8-12, 2007.

* cited by examiner

METHODS FOR SCHEDULING COMMUNICATION RESOURCES TO A WIRELESS DEVICE AND SCHEDULING DEVICE

PRIORITY

This nonprovisional application is a U.S. National Stage Filing under 35 U.S.C. §371 of International Patent Application Serial No. PCT/SE2012/050687 filed Jun. 20, 2012 and entitled "Methods For Scheduling Communication Resources to a Wireless Device and Scheduling Device."

TECHNICAL FIELD

The technology disclosed herein relates generally to the field of wireless communication systems, and in particular to scheduling of communication resources within such wireless communication systems.

BACKGROUND

Long Term Evolution (LTE) is a standard for wireless communication in which the communication is based on orthogonal frequency division multiplex (OFDM). OFDM provides an efficient use of the available communication resources in that communication resources are shared between all users. The communication resources can be in time-domain, in frequency-domain or in spatial-domain. A scheduler is used for allocating the different types of communication resources in view of various aspects, such as fairness among users, avoiding congestion in the communication system and limiting interference.

A scheduling decision is made every transmission time interval (TTI) for each transmission and a weight is used to prioritize user equipment (UE) in time domain. The UE having the highest weight is the UE that will get the communication resources during that TTI. The weight may be calculated in accordance with a scheduling strategy implemented in the scheduler, and examples of such scheduling strategies comprise Round Robin (RR) and Proportional Fair (PF). Different scheduling strategies use different inputs in the weight calculation. A scheduler implementing PF considers the user bit rate and channel quality when calculating the weight, while a scheduler implementing RR depends on elapsed time since last scheduled time for a particular UE thus achieving a pure fairness. The weight is calculated every TTI, helping make the scheduling decision for each transmission.

Using the RR and PF algorithms, the weight of a UE typically decreases once the UE gets scheduled and it is therefore unlikely that it will get the highest weight in the next TTI. In most scenarios the UE will be scheduled and then after a while it gets scheduled again, and so on until its buffer is empty, as illustrated in FIG. 1. For example, a first UE is scheduled at odd-numbered TTIs as illustrated by the upper line of arrows, and a second UE is scheduled at even-numbered TTIs as illustrated by the lower line of arrows. The first and second UEs are thus scheduled alternately. Although the known scheduling strategies provide a rather high fairness of use of the communication resources, they also entail a number of drawbacks.

For example, for a UE that needs many transmissions in total it might take hundreds of TTIs between the first and last transmissions and the total time for downloading or uploading may thus become long. During that time the UE has to listen to the potential scheduling, which results in high battery use.

SUMMARY

An object of the present disclosure is to overcome or at least alleviate one or more of the above mentioned problems.

The object is, according to a first aspect, achieved by a method performed in a scheduling device for scheduling communication resources to a wireless device. The wireless device is configured for wireless communication within a communication system. The method comprises detecting, within a group of wireless devices of a first priority class, a first wireless device to be scheduled; determining a cluster time for the first wireless device; and scheduling, for the duration of the determined cluster time, consecutive communication resource units to the first wireless device.

The method makes the scheduling valid for the duration of several communication resources. An increased user object bit rate, defined as data packet size divided by the total transmission time, is obtained, which provides an improved user experience, particularly when downloading or uploading high burst data such as music streaming. The scheduling method allows a wireless device that is able to enter a discontinuous transmission mode, to save battery time since it may remain in sleep mode for a longer period of time without the need to listen to scheduling messages.

The object is, according to a second aspect, achieved by a scheduling device for scheduling communication resources to a wireless device. The wireless device is configured for wireless communication within a communication system. The scheduling device comprises a processing unit configured to detect, within a group of wireless devices of a first priority class, a first wireless device to be scheduled; determine a cluster time for the first wireless device; and schedule, for the duration of the determined cluster time, consecutive communication resource units to the first wireless device.

Advantages corresponding to the above are obtained also for this aspect.

Further aspects, features and advantages of the present disclosure will become clear upon reading the following description and the accompanying drawings.

DETAILED DESCRIPTION OF EMBODIMENTS

Figure 1:
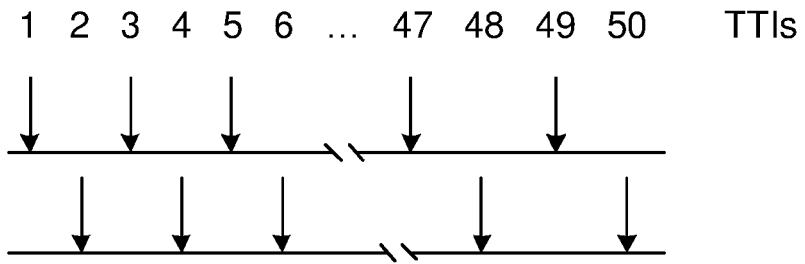
FIG. 1 illustrates a known scheduling pattern.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
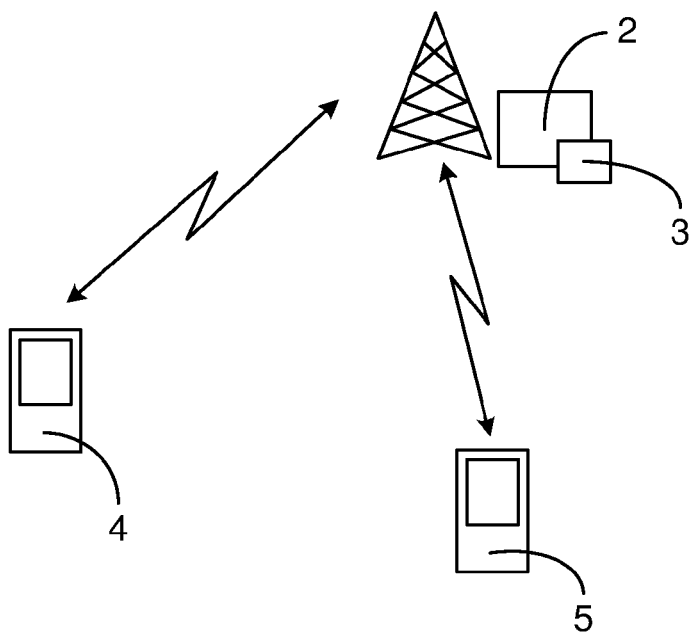
FIG. 2 illustrates an exemplifying environment wherein aspects of the present disclosure may be implemented.

FIG. 2 illustrates schematically an exemplifying environment in which embodiments of the present disclosure may be implemented. In particular, FIG. 2 illustrates a communication system 1 comprising one or more network nodes 2, in the following exemplified by base station nodes 2 (only one illustrated in the figure) configured to provide wireless communication links for a number of wireless devices 4, 5. The wireless device 4, 5 is a device able to receive and/or transmit wirelessly, and should be construed as encompassing various types of devices such as for example mobile phones, smart phones, or laptops. Further, the term wireless device is also intended to encompass devices not necessarily in any (direct) interaction with a user, for example devices with communication capabilities of machine-type character, such as sensors, measurement devices etc. Depending on type of device, and sometimes also depending on communication system in which it is used, the wireless device 4, 5 may be denoted differently, for example user equipment or mobile device. The wireless devices 4, 5 configured to enter a discontinuous reception mode (DRX), i.e. able to enter a low-power mode or sleep mode in which it consumes less or no power, may particularly benefit from the various embodiments of the present disclosure.

The base station node 2 is configured to serve the wireless devices 4, 5 located within its one or more coverage areas, also denoted cells. The base station node 2 may, as a particular example be an evolved Node B, also denoted eNB, in case the communication system 1 is a Long Term Evolution (LTE) system. It is noted that different communication systems use different terms for denoting a base station node; for example, in a communication system adopting the GSM standard, the term base transceiver station is commonly used, in yet other communication systems other terms are used.

The communication system 1 further comprises a scheduling device 3, also denoted scheduler. The scheduling device 3 is typically associated with and co-located with the base station node 2 providing a scheduling function for scheduling communication resources for the wireless devices 4, 5 located within the one or more coverage areas, also denoted cells, of the base station 2. The scheduling device 3 may comprise a processing unit executing scheduling methods and algorithms of the present disclosure. The scheduling device 3 may be configured to receive various inputs for use in the scheduling methods, and may be configured to output resource assignments for the wireless devices 4, 5 both in downlink and uplink. Such resource assignment information is sent to and monitored by all wireless devices 4, 5, e.g. for LTE on the Physical Downlink Control Channel (PDCCH). The scheduling device 3 is described further with reference to FIG. 7.

It is also noted that the wireless device 4, 5 may have multiple data bearers which are associated with different services. The scheduling device 3 may be configured to schedule resources individually for these services in accordance with the various embodiments of the present disclosure.

As mentioned in the background section, in OFDM the communication resources may be in time-domain, in frequency domain and even in spatial domain. In the communication resource scheduling each wireless device 4, 5 may be allocated a specific number of frequency subcarriers for a predetermined amount of time. These are referred to as physical resource blocks (PRBs) in the LTE specifications. PRBs thus have both a time and frequency dimension. The scheduling device 3 is configured to handle such allocation of PRBs. The scheduling device 3 is thus configured to allocate the different communication resources between the wireless devices for each transmission, both in uplink and downlink. That is, the scheduling device 3 is configured to inform the wireless device 4, 5 "when", "where" and "how" the transmission will take place, upon which the wireless device 4, 5 is able to send or receive data via the uplink shared channels and downlink shared channels. "When" means the point of time that the transmission will take place; "where" means a physical resource block (PRB) that can be used for the transmission in frequency; and "how" indicates e.g. modulation, code rate and transmission scheme to use.

Briefly, in an aspect, a clustered scheduling is provided, which may be used in addition to an existing scheduling strategy. Instead of scheduling wireless devices alternately, the clustered scheduling tries to schedule the wireless device consecutively. The introduction of such clustered scheduling need not, in long term, change the number of transmissions for a certain wireless device over a certain time period, but only impacts the timing of the transmissions. The clustered scheduling strategy is particularly suitable for high-burst traffic.

The cluster scheduling is not intended to replace the conventional scheduling, but mainly intended for use together with conventional scheduling schemes. A conventional scheduling algorithm, for example the earlier mentioned RR and PF algorithms, may be used to calculate the weight and prioritize the wireless devices 4, 5 in time domain. The cluster scheduling of the present disclosure will then group the scheduled wireless devices 4, 5 based on their weight. In the conventional scheduling the scheduling decision, i.e. which wireless device gets scheduled, is reevaluated for each TTI, but with the cluster scheduling the scheduling decision is made to be valid longer to make the same wireless device being scheduled for a certain number of consecutive TTIs. The number of consecutive TTIs during which a particular wireless device 4, 5 is scheduled is hereafter denoted cluster time. As mentioned above, seen over time, the total number of scheduled TTIs for each wireless device 4, 5 should not be changed by the cluster scheduling, but the scheduled TTIs for the particular wireless device 4, 5, are grouped in consecutive TTIs instead of being spread out in time.

A particular example is given in the following for illustration. Two wireless devices, a first wireless device 4 and a second wireless device 5, are downloading the same amount of data, which needs 25 downlink transmissions, i.e. each wireless device 4, 5 needs to be scheduled 25 times. Assume that only one of the wireless devices 4, 5 can be scheduled at each TTI, and that they both have the same channel conditions.

With the conventional PF-based scheduler, letting the first wireless device 4 being scheduled at time instance 1, the bit rate of the first wireless device 4 is increased. Following the PF strategy, the second wireless device 5 will then get higher weight than the first wireless device 4, and will therefore be scheduled at time instance 2. At time instance 3, the first wireless device 4 will be scheduled again and so on. In all, in this example the first wireless device 4 will be scheduled at odd-numbered TTIs and the second wireless device 5 will be scheduled at even-numbered TTIs (compare FIG. 1). Since both of them need 25 downlink transmissions to complete the downloading, the first wireless device 4 will complete its downloading of the whole file (or data packet)

at time instance 49, and the second wireless device 5 completes its downloading at time instance 50. In all, the first wireless device 4 takes 49 ms to download the file and the second wireless device 5 needs 50 ms to download the file.

Figure 3:
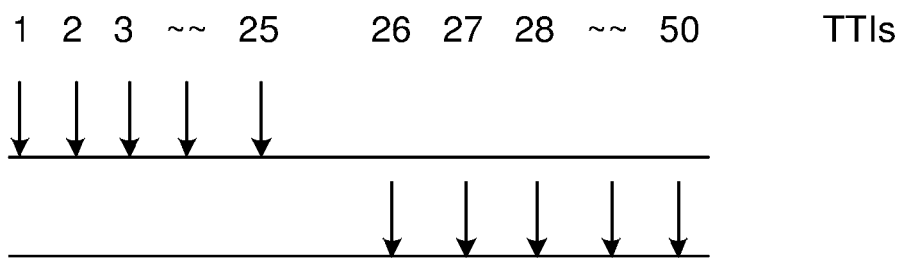
FIG. 3 illustrates a clustered scheduling in accordance with an aspect of the present disclosure.

With the cluster scheduling, illustrated in FIG. 3 for the same example, the cluster time may be set to 25, which means that once the wireless device 4, 5 is scheduled it will be scheduled for 25 consecutive TTIs. Continuing the same example, the first wireless device 4, having the highest weight, will be scheduled from time instance 1 to time instance 25, and the second wireless device 5 will be scheduled from time instance 26 to time instance 50. In the end, the second wireless device 5 finishes downloading all the data at the same time as in the case of no cluster scheduling, but it only takes half of the time for the first wireless device 4 to download the whole file. This may be translated into doubled downloading speed for the first wireless device 4. In addition, the cluster scheduling also saves the battery of the first wireless device 4 by 50% if it has the capability of entering a sleep mode, e.g. a discontinuous reception (DRX) mode enabled wireless device. That is, the first wireless device 4 does not need to stay awake for the duration of 50 TTIs in order to listen for scheduling messages.

The cluster time can be determined based on various criteria and it may be dynamically changed in view of different scenarios. Examples of criteria that the cluster time may be based on comprise e.g. traffic load in the cell(s), traffic load in the communication system 1, buffer size of the wireless device(s) and/or type of traffic. Yet another example of a criteria is a delay budget of the data traffic in the cell(s) or in the communication system 1, requiring that each wireless device 4, 5 is scheduled at least once during the delay budget. The maximum cluster time can be determined e.g. by dividing the delay budget for a particular traffic class by the number of wireless devices categorized in this traffic class. As a particular example, assume the delay budget to be 300 ms, and that there are 20 wireless devices in the cell that need to be scheduled. The cluster time could then be set to maximum 15 ms (i.e. 20 wireless devices×15 ms=300 ms in total), while if there are only 5 wireless devices to be scheduled, the maximum cluster time could be set to 60 ms. Further, if several wireless devices can be scheduled each TTI, then the cluster time is affected in view thereof. In short, the higher traffic load in a cell, the shorter the cluster time is set, so that no single wireless device needs to wait too long. Different cluster times may thus be determined for the different wireless devices based on the various criteria. It is noted that the cluster time may be set to any value, including setting it to zero, whereby the feature of cluster scheduling is turned off. In such case conventional scheduling is performed.

Figure 4:
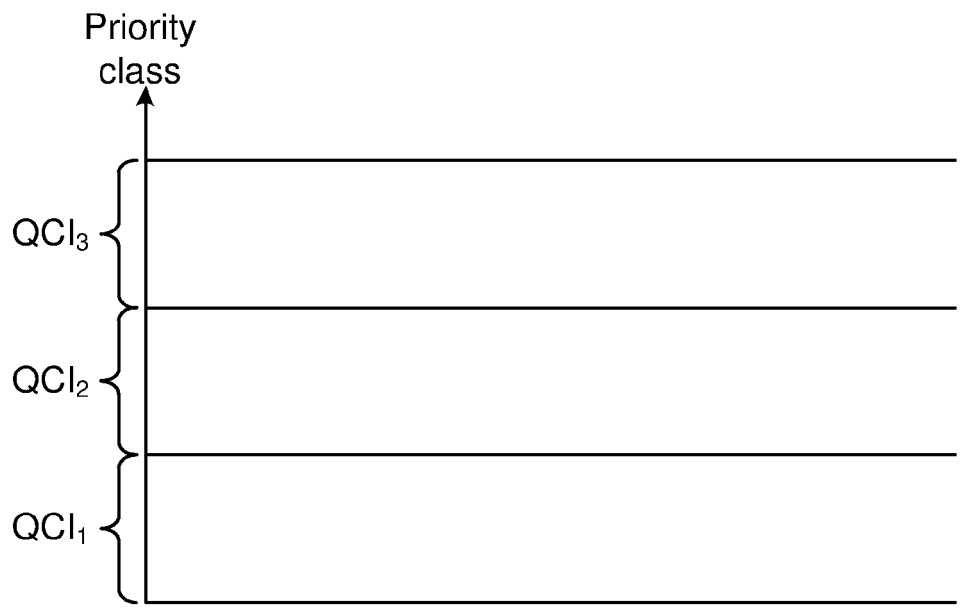
FIG. 4 illustrates an example of priority classes.

FIG. 4 illustrates an example of priority classes. In particular, three different priority classes are indicated: $QCI_1$, $QCI_2$, $QCI_3$, QCI being an abbreviation for Quality of Service (QoS) Class Identifier used in 3GPP. It is noted that such priority classes may be denoted differently in other communication systems. The wireless devices may be categorized into one of the priority classes. The cluster scheduling of the present disclosure detects which one of the wireless devices within a priority class that should be scheduled, and then determines a cluster time for this wireless device. The scheduling device 3 then schedules this wireless device for all TTIs for the duration of the determined cluster time.

As mentioned earlier, the determined cluster time may be dynamically changed. For example, assume that a first wireless device 4 belonging to the priority class $QCI_1$ is currently scheduled for a first cluster time. Should a second wireless device 5 belonging to a higher priority class than the first wireless device 4 need to be scheduled, then the first cluster time is abandoned and the second wireless device 5 is scheduled instead. It is noted that such prioritizing of the wireless devices may be handled by known prioritizing schemes, for example as those used in known scheduling algorithms.

Figure 5:
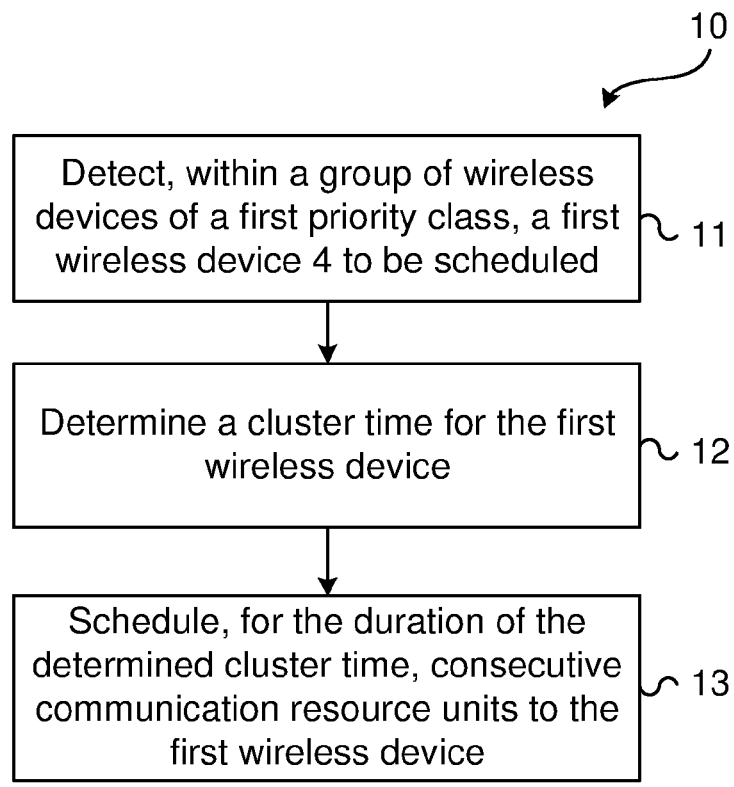
FIG. 5 is a flow chart of a method in accordance with an aspect of the present disclosure.

FIG. 5 is a flow chart of a method in accordance with an aspect of the present disclosure. The method 10 is performed in a scheduling device 3 for scheduling communication resources to a wireless device 4. The wireless device 4 is configured for wireless communication within a communication system 1, such as the communication system 1 described with reference to FIG. 3. The method 10 comprises detecting 11, within a group of wireless devices of a first priority class, a first wireless device 4 to be scheduled. The detection of which wireless device is to be scheduled can be performed using known methods, such as algorithms based on PF or RR, wherein a wireless device having the highest weight is detected as the one to be scheduled.

The method 10 further comprises determining 12 a cluster time for the first wireless device 4.

The method 10 further comprises scheduling 13, for the duration of the determined cluster time, consecutive communication resource units to the first wireless device 4.

In an embodiment, the detecting 11 comprises detecting the first wireless device 4 to have the highest priority among all wireless devices within the first priority class.

In an embodiment, the detecting 11 is performed by prioritizing wireless devices of the first priority class using a round robin strategy or a proportional fair strategy and thereby detecting the first wireless device 4 to have the highest priority. That is, a weight may be determined for each wireless device in a particular priority class, and then the wireless device having the highest weight is detected as the one having the highest priority and should thus be scheduled. It is noted that other strategies for prioritizing the wireless devices could be used.

In an embodiment, the determining 12 of a cluster time comprises determining a cluster time based on one or more of: traffic load in a cell in which the first wireless device 4 is being serviced, traffic load within the communication system 1, type of traffic and amount of data in buffer of the first wireless device 4. Various criteria may thus be used for determining the cluster time.

In an embodiment, the method comprises detecting, during the cluster time, a second wireless device 5 of a second priority class to be scheduled, wherein wireless devices of the second priority class have higher priority than the wireless devices of the first priority class, and interrupting the scheduling to the first wireless device 4. That is, the cluster time is interrupted upon detection of a wireless device 5 having a higher priority than the wireless device 4 being cluster scheduled to have consecutive communication resources within this cluster time. Wireless devices of different priority classes thus receives service according to priority, e.g. in view of quality of service paid for. The remaining consecutive communication resources scheduled for the first wireless device 4 are released and may be made available for use by other wireless devices. The method as described is performed also for the second wireless device 5, having been detected to have higher priority and therefore to be the wireless device that is to be scheduled. That is, a cluster time will be determined for it and consecutive communication resources will be scheduled for it.

In an embodiment, the method 10 comprises detecting an empty data buffer of the first wireless device 4 prior to the expiry of the determined cluster time, and releasing the remaining consecutive communication resource units for scheduling. If the first wireless device 4 has no more data to send or receive, the remaining communication resources scheduled for it are released and may be scheduled for other wireless devices.

In an embodiment, the determining 12 of a cluster time comprises determining the maximum cluster time to be equal to a maximum scheduling delay time of the first priority class divided by the number of users within the first priority class. By determining a maximum cluster time that is allowed to be used for any wireless device, it is ensured that all wireless devices are indeed scheduled within a reasonable time.

In an embodiment, the cluster time is determined by multiplying a number of consecutive communication resource units by the duration of a single communication resource unit.

The term "consecutive communication resource units" is intended to mean that during the cluster time the wireless device gets communication resources consecutively in the time domain. However, it is noted that there is no need to give the same type of scheduled communication resources. That is, each scheduling within the cluster time will be dynamic which means that different data may be transmitted and different modulations schemes may be used, and also that different communication resources in frequency could be used.

In the various embodiments of the methods of the present disclosure, each scheduling decision within a cluster time is thus dynamic. That is, for each scheduling decision ("when", "where", "how") that is made for the wireless device 4, 5 within the determined cluster time, different data may be transmitted, using different modulation schemes and possibly different frequency resources. This may result in improved link adaptation since the scheduling decision made every TTI also comprises a choice of e.g. modulation scheme, which in turn is based on channel quality estimations. Such channel quality estimations take inter-cell interference into account, and with the cluster scheduling the measured inter-cell interference will be valid and accurate for the whole cluster time, i.e. for a longer duration. In contrast, the prior art solution (refer to FIG. 1), with the scheduled wireless device changing every TTI in the neighboring cell, the measured inter-cell interference varies greatly and may be hard to keep track of. The cluster scheduling may thus improve the link adaptation performance by decreasing the variation of inter-cell interference. This decreased inter-cell interference variation may consequently also improve the accuracy of the channel estimation.

Figure 6:
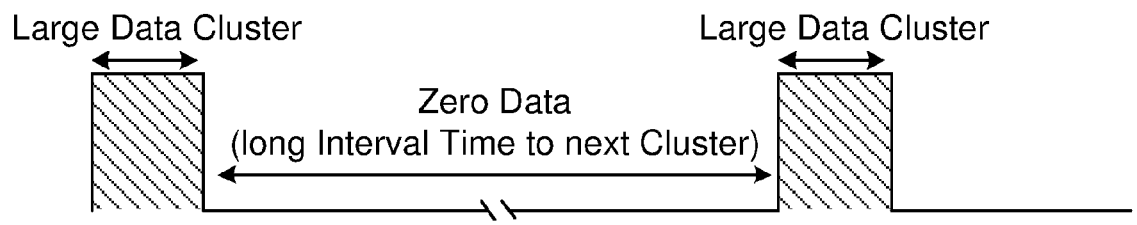
FIG. 6 illustrates data transmission pattern of high-burst cluster traffic.

FIG. 6 illustrates data transmission pattern of high-burst cluster traffic. A traffic mode, presently popular in wireless communication systems, is high-burst traffic. Such high-burst traffic is used in several applications, e.g. streaming of music and video. In this type of traffic, illustrated in FIG. 6, each burst contains a large amount of data, followed by a long silent time before another large data burst arrives. The above presented method is particularly advantageous for such high-burst traffic. As mentioned earlier, the method provides an increased user object bit rate, which is defined as the data packet size divided by the total transmission time. This is turn gives a better user experience; particularly when downloading or uploading the high burst data.

Figure 7:
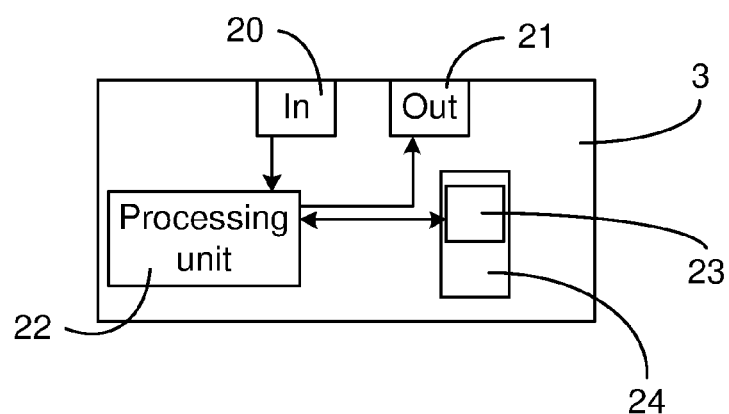
FIG. 7 illustrates an exemplifying scheduling device comprising means for implementing embodiments of the methods.

FIG. 7 illustrates an exemplifying scheduling device comprising means for implementing embodiments of the methods. The scheduling device 3 is configured to schedule communication resources to a wireless device 4, which in turn is configured for wireless communication within a communication system 1.

The scheduling device 3 comprises a processing unit 22, e.g. a central processing unit (CPU), microcontroller, digital signal processor (DSP), etc., capable of executing software instructions stored in a computer program product 24 e.g. in the form of a memory. The processing unit 22 is connected to an input device 20 that receives inputs (scheduling requests) from wireless devices 4, 5, typically via some other device, e.g. a receiver, of the base station node 2. It is noted that although only one processing unit 22 is illustrated in FIG. 7, the implementation may comprise distributed hardware so that several processing units are used rather than one when running the software.

The processing unit 22 is further connected to an output device 21 by means of which it can transmit outputs (scheduling information) to wireless devices 4, 5, typically via some other device, e.g. a transmitter, of the base station node 2.

The described methods and algorithms or parts thereof for use in scheduling requests may be implemented e.g. by software and/or application specific integrated circuits in the processing unit 22. To this end, the scheduling device 3 may further comprise a computer program 23 stored on the computer program product 24.

The processing unit 22 of the scheduling device 3 is, in an embodiment, configured to:
  detect, within a group of wireless devices of a first priority class, a first wireless device 4 to be scheduled,
  determine a cluster time for the first wireless device 4, and
  schedule, for the duration of the determined cluster time, consecutive communication resource units to the first wireless device 4.

In an embodiment, the processing unit 22 is configured to detect the first wireless device 4 to have the highest priority among all wireless devices within the first priority class.

In an embodiment, the processing unit 22 is configured to determine the cluster time by utilizing one or more of: traffic load in a cell wherein the first wireless device 4 is being serviced, traffic load within the communication system 1, type of traffic and amount of data in buffer of the first wireless device 4.

In an embodiment, the processing unit 22 is configured to interrupt the cluster time upon detection of a second wireless device 5 of a second priority class, wherein wireless devices of the second priority class have higher priority than the wireless devices of the first priority class.

In an embodiment, the processing unit 22 is configured to release the remaining consecutive communication resources for use by the other wireless devices upon detection of an empty data buffer of the first wireless device 4 prior to the expiry of the determined cluster time.

With reference still to FIG. 7, the present disclosure also encompasses the mentioned computer program 23 for handling scheduling requests. The computer program 23 comprises computer program code which when run on the scheduling device 3, and in particular the processing unit 22 thereof, causes the scheduling device 3 to perform the methods as described.

A computer program product 24 is also provided comprising the computer program 23 and computer readable means on which the computer program 23 is stored. The computer program product 24 may be any combination of read and write memory (RAM) or read only memory (ROM). The computer program product 24 may also comprise persistent storage, which, for example can be any single one or combination of magnetic memory, optical memory, or solid state memory.

It is noted that although LTE and corresponding vocabulary has been used extensively for exemplifying various aspects of the present disclosure, the teachings may be applied in other communication systems as well, for example Wideband Code Division Multiple Access (WCDAM) or Worldwide Interoperability for Microwave Access (WiMAX).

The invention claimed is:

1. A method performed in a scheduling device for scheduling communication resources to a wireless device configured for wireless communication within a communication system, the method comprising:
   detecting, within a group of wireless devices of a first priority class, a first wireless device to be scheduled,
   determining a cluster time for the first wireless device, wherein a maximum cluster time is equal to a maximum scheduling delay time of the first priority class divided by a number of users within the first priority class, and
   scheduling, for the duration of the determined cluster time, consecutive communication resource units to the first wireless device.

2. The method as claimed in claim 1, wherein the detecting comprises detecting the first wireless device to have the highest priority among all wireless devices within the first priority class.

3. The method as claimed in claim 1, wherein the detecting is performed by prioritizing wireless devices of the first priority class using a round robin strategy or a proportional fair strategy and thereby detecting the first wireless device to have the highest priority.

4. The method as claimed in claim 1, wherein the determining of a cluster time comprises determining a cluster time based on one or more of: traffic load in a cell in which the first wireless device is being serviced, traffic load within the communication system, type of traffic and amount of data in buffer of the first wireless device.

5. The method as claimed in claim 1, comprising
   detecting, during the cluster time, a second wireless device of a second priority class to be scheduled, wherein wireless devices of the second priority class have higher priority than the wireless devices of the first priority class, and
   interrupting the scheduling to the first wireless device.

6. The method as claimed in claim 1, comprising
   detecting an empty data buffer of the first wireless device prior to the expiry of the determined cluster time, and
   releasing the remaining consecutive communication resource units for scheduling.

7. The method as claimed in claim 1, wherein the cluster time is determined by multiplying a number of consecutive communication resource units by the duration of a single communication resource unit.

8. A scheduling device for scheduling communication resources to a wireless device configured for wireless communication within a communication system, the scheduling device comprising one or more processors configured to:
   detect, within a group of wireless devices of a first priority class, a first wireless device to be scheduled,
   determine a cluster time for the first wireless device, wherein a maximum cluster time is equal to a maximum scheduling delay time of the first priority class divided by a number of users within the first priority class, and
   schedule, for the duration of the determined cluster time, consecutive communication resource units to the first wireless device.

9. The scheduling device as claimed in claim 8, wherein the one or more processors are configured to detect by detecting the first wireless device to have the highest priority among all wireless devices within the first priority class.

10. The scheduling device as claimed in claim 8, wherein the one or more processors are configured to determine the cluster time by utilizing one or more of: traffic load in a cell wherein the first wireless device is being serviced, traffic load within the communication system, type of traffic and amount of data in buffer of the first wireless device.

11. The scheduling device as claimed in claim 8, wherein the one or more processors are configured to interrupt the cluster time upon detection of a second wireless device of a second priority class, wherein wireless devices of the second priority class have higher priority than the wireless devices of the first priority class.

12. The scheduling device as claimed in claim 8, wherein the one or more processors are configured to release the remaining consecutive communication resources for use by the other wireless devices upon detection of an empty data buffer of the first wireless device prior to the expiry of the determined cluster time.

* * * * *